US012009607B2

(12) United States Patent
Zhu et al.

(10) Patent No.: US 12,009,607 B2
(45) Date of Patent: Jun. 11, 2024

(54) USER EQUIPMENT WITH AN INTEGRATED ANTENNA SYSTEM FOR RADIATING AND SENSING MILLIMETER-WAVES

(71) Applicant: Google LLC, Mountain View, CA (US)

(72) Inventors: Jiang Zhu, Cupertino, CA (US); Maryam Tabesh, San Francisco, CA (US)

(73) Assignee: Google LLC, Mountain View, CA (US)

( * ) Notice: Subject to any disclaimer, the term of this patent is extended or adjusted under 35 U.S.C. 154(b) by 122 days.

(21) Appl. No.: 17/636,888

(22) PCT Filed: Dec. 18, 2019

(86) PCT No.: PCT/US2019/067196
§ 371 (c)(1),
(2) Date: Feb. 20, 2022

(87) PCT Pub. No.: WO2021/126192
PCT Pub. Date: Jun. 24, 2021

(65) Prior Publication Data

US 2022/0344817 A1 Oct. 27, 2022

(51) Int. Cl.

*H01Q 1/24* (2006.01)
*H01Q 7/00* (2006.01)
*H01Q 21/08* (2006.01)

(52) U.S. Cl.

CPC ............... *H01Q 7/00* (2013.01); *H01Q 1/243* (2013.01); *H01Q 21/08* (2013.01)

(58) Field of Classification Search

CPC .......... H01Q 7/00; H01Q 1/243; H01Q 21/08; H01Q 1/38

See application file for complete search history.

(56) References Cited

U.S. PATENT DOCUMENTS

| | | | |
|---|---|---|---|
| 10,241,631 | B2 | 3/2019 | Chai et al. |
| 10,305,172 | B2 | 5/2019 | Noori et al. |
| 2012/0092220 | A1 | 4/2012 | Tani et al. |

(Continued)

FOREIGN PATENT DOCUMENTS

| | | |
|---|---|---|
| CN | 107768842 | 3/2018 |
| WO | 2021126192 | 6/2021 |

OTHER PUBLICATIONS

"International Search Report and Written Opinion", Application No. PCT/US2019/067196, Sep. 16, 2020, 15 pages.

(Continued)

*Primary Examiner* — Dieu Hien T Duong
(74) *Attorney, Agent, or Firm* — Colby Nipper PLLC

(57) ABSTRACT

The present disclosure describes systems and manufacturing techniques directed to a user equipment (UE) that can be bezel-less and has a loop antenna system for radiating and sensing millimeter-waves. The UE includes a housing and a display within the housing. The display is disposed within a display layer across a primary plane defining a front surface of the user equipment. The loop antenna system is within the housing and is configured to radiate a field of millimeter-waves within the spatial region and sense a reflection of the millimeter-waves by an object within the spatial region. Described manufacturing techniques include multi-layer fabrication techniques that are applicable to printed circuit boards and/or integrated circuit (IC) devices.

18 Claims, 8 Drawing Sheets

(56) References Cited

U.S. PATENT DOCUMENTS

2019/0257933 A1 8/2019 Nath et al.

OTHER PUBLICATIONS

Golightly, "This Antenna-on-Display Tech Might be Exactly What 5G is Missing", https://www.androidheadlines.com/2019/05/5g-antenna-missing-tech.html, May 6, 2019, 4 pages.
"International Preliminary Report on Patentability", Application No. PCT/US2019/067196, May 17, 2022, 11 pages.

| Name | Theta | Ang | Mag |
|---|---|---|---|
| m1 | 270.0000 | -90.0000 | -2.2217 |
| m2 | 90.0000 | 90.0000 | -2.2423 |
| m3 | 40.0000 | 40.0000 | 2.3456 |
| m4 | 40.0000 | 40.0000 | 0.9553 |
| m5 | 50.0000 | 50.0000 | -1.7717 |

800

USER EQUIPMENT WITH AN INTEGRATED ANTENNA SYSTEM FOR RADIATING AND SENSING MILLIMETER-WAVES

RELATED APPLICATION(S)

This application is a national stage entry of International Application No. PCT/US2019/067196, filed Dec. 18, 2019, the disclosure of which is incorporated herein by reference in its entirety.

BACKGROUND

User equipment (UE), such as a smartphone, often include hardware to radiate and sense electromagnetic waves having wavelengths that range from 10 millimeters (mm) in length down to 1 mm in length. Electromagnetic waves having wavelengths within this range are often referred to as millimeter-waves. Examples of hardware that radiate and sense millimeter-waves include Fifth Generation New Radio (5G NR) wireless communication hardware operating at frequencies exceeding 40 gigahertz (GHz) and radar-based gesture-recognition hardware operating at frequencies exceeding 70 GHz.

These newer communication frequencies can conflict with desired UE designs, however. To maximize display size, UEs are being manufactured with larger and larger display-to-body-surface ratios, resulting in many UEs having displays that cover nearly all of a top surface of the UE. Further still, even small cut-outs of displays, which were fairly common in the recent past, are rapidly being phased out to increase display ratios. Display that do not have cut outs are referred to as "bezel-less."

These large, bezel-less displays easily distort millimeter-waves used in newer communications. This distortion can lead to reduced sensitivity to communications, causing reduced bandwidth or increased battery usage, or both. Also, distortion of millimeter-waves associated with radar fields can inhibit radar-based gesture sensing.

SUMMARY

The present disclosure describes methods, systems, and manufacturing techniques directed to a user equipment (UE) with a loop antenna system for radiating and sensing millimeter-waves, which can be especially useful for UEs that have bezel-less displays. This loop antenna system overcomes many of the current challenges with millimeter-wave communication systems, such as (i) providing spatial coverage of a millimeter-wave field over a surface of a display of the user equipment such that a gesture made near the surface of the display is consistently and repeatable recognizable by the radar-based gesture recognition system, (ii) improving spatial coverage of 5G NR millimeter-waves over the display of the UE such that communication blind spots are reduced, and (iii) shielding other systems of the UE from millimeter-waves, thereby reducing noise and improving performance of other systems.

In some aspects, a UE is described. The UE includes a housing and a display within the housing where the display resides in a display layer across a primary plane. The display layer across the primary plane defines a front surface of the UE, over which a spatial region resides. The UE also includes a loop antenna system within the housing that is configured to sense a reflection of the millimeter-waves by an object within the spatial region. The loop antenna system has one or more loop antennas carried in the housing and is disposed below the display layer across the primary plane.

In other aspects a method is described. The method is performed by a UE that includes a housing, millimeter-wave circuitry, a display disposed within a display layer across a primary plane defining a front surface of the UE, and one or more loop antennas disposed behind the display layer across the primary plane. The method includes activating millimeter-wave circuitry to cause at least one of the one or more loop antennas to radiate millimeter-waves within a spatial region over the display and sensing, through at least one of the one or more loop antennas, a reflection of the millimeter-waves. The method also includes detecting a reflection of an object within the spatial region, where the detected reflection of the millimeter-waves represents a gesture performed by the object within the spatial region. The method also includes determining, using the detected reflection of the millimeter-waves, the gesture performed by the object within the spatial region and providing, to an application, the determined gesture.

The details of one or more implementations are set forth in the accompanying drawings and the following description. Other features and advantages will be apparent from the description and drawings, and from the claims. This summary is provided to introduce subject matter that is further described in the Detailed Description and Drawings. Accordingly, a reader should not consider the summary to describe essential features nor limit the scope of the claimed subject matter.

BRIEF DESCRIPTION OF THE DRAWINGS

This document describes details of one or more aspects of a user equipment, in particular bezel-less, with an integrated antenna system for radiating and sensing millimeter waves. The use of the same reference numbers in different instances in the description and the figures may indicate like elements.

DETAILED DESCRIPTION

The present disclosure describes methods, systems, and manufacturing techniques directed to a user equipment (UE) with a loop antenna system for radiating and sensing millimeter-waves, which can be especially useful for UEs that have bezel-less displays. The UE includes a housing and a display within the housing. The display is disposed across a primary plane that defines a top surface of the UE and over which a spatial region resides. The loop antenna system is within the housing and is configured to radiate a field of millimeter-waves within the spatial region and sense a reflection of the millimeter-waves by an object within the spatial region. Described manufacturing techniques include multi-layer fabrication techniques that are applicable to printed circuit boards (PCBs) and/or integrated circuit (IC) devices.

The described, integrated antenna system enhances performance of the UE across multiple fronts. First, the antenna system improves, for a radar-based gesture-recognition system of the user equipment, spatial coverage of a millimeter-wave radar field over a surface of a display of the UE such that a gesture made near the surface of the display is consistently and repeatably recognizable by the radar-based gesture-recognition system. Second, the antenna system improves, for 5G NR wireless communication hardware of the UE, spatial coverage of 5G NR millimeter-waves over the display of the UE such that wireless communication blind spots are eliminated. Third, the antenna system can be isolated within the UE to shield other systems of the UE from millimeter-waves, thereby reducing system noise and improving performance of the other systems. Furthermore, the antenna system can be configured to outperform dipole and patch antenna systems that are available today.

While features and concepts of the described systems and techniques can be implemented in any number of different environments, systems, devices, and/or various configurations, aspects are described in the context of the following example devices, systems, and configurations.

Operating Environment

Figure 1:
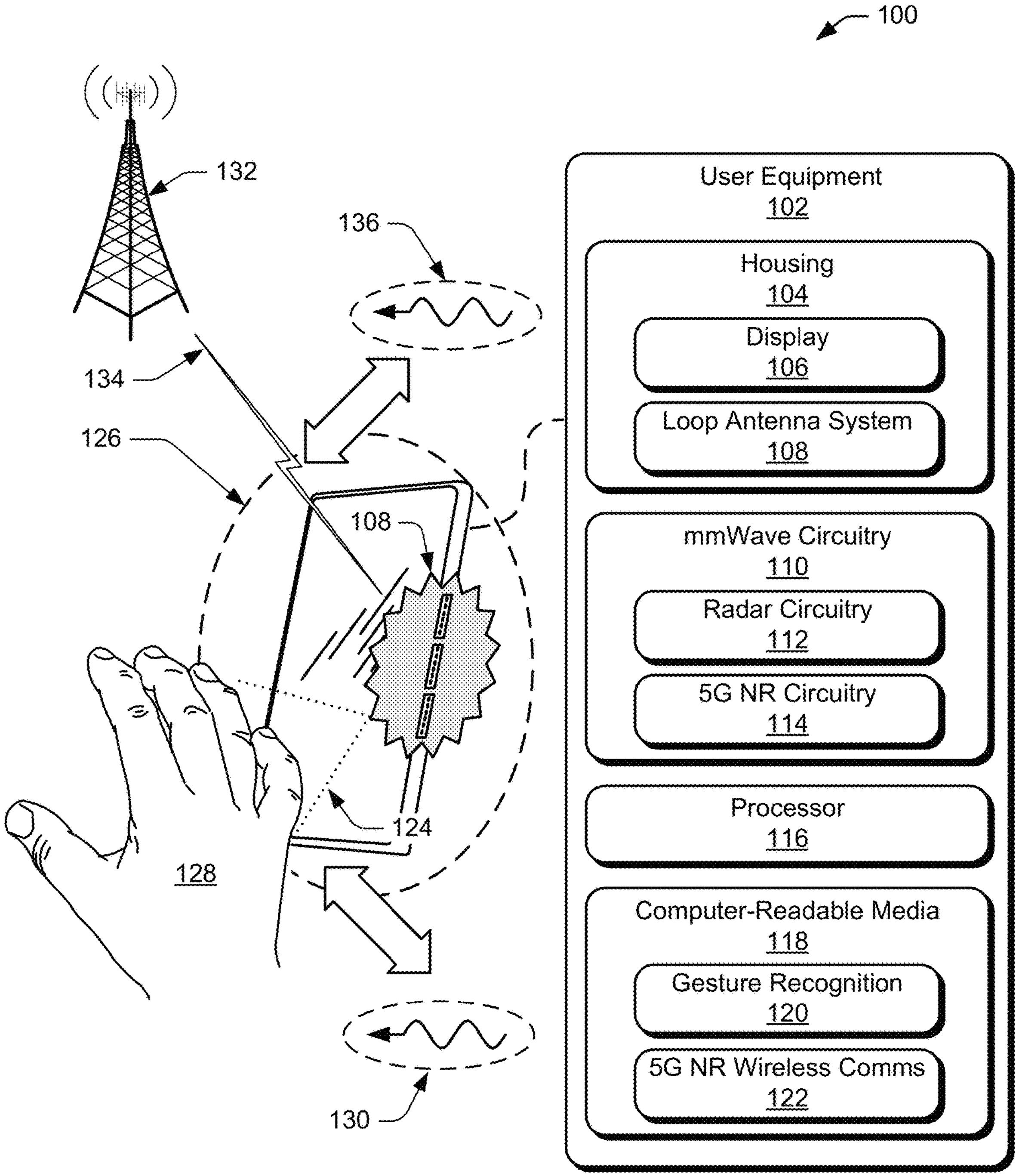
FIG. 1 illustrates an example operating environment in accordance with one or more aspects.

FIG. 1 illustrates an example operating environment 100, which includes a user equipment (UE) 102 that is bezel-less. Although the UE 102 is illustrated as a smartphone, the UE 102 may be another type of bezel-less device (e.g., a tablet, computer, smartwatch, television display). Even though the embodiments are described in connection with a bezel-less device, the embodiment can also include bezel-devices.

The UE 102 includes a housing 104. Within the housing 104 is a display 106 for presenting images. The display 106 (e.g., a bezel-less display) may be, for example, a light-emitting diode (LED) display, an organic light-emitting diode (OLED) display, or a liquid crystal display (LCD). The display 106 may further include touchscreen capabilities through capacitance-sensing mechanisms, resistance-sensing mechanisms, or the like. In some instances, the loop antenna system 108 may be disposed proximate to an underside surface of the display 106.

Also, within the housing 104 is a loop antenna system 108 (e.g., an integrated antenna system) for radiating (e.g., transmitting) and sensing (e.g., receiving) millimeter-waves. The loop antenna system 108 may include multiples of antennas, having one or more loop antennas dedicated to radiating millimeter-waves as well as one or more other antennas dedicated to sensing millimeter-waves. Furthermore, the antennas of the loop antenna system 108 may be loop antennas manufactured using multi-layer fabrication techniques that are applicable to printed circuit board (PCB) manufacturing or integrated circuit (IC) manufacturing.

The UE 102 includes millimeter-wave circuitry (e.g., mmWave circuitry) 110 that is electrically connected to the loop antenna system 108. In general, the mmWave circuitry 110 may have isolation thresholds that are desirable to reduce noise and optimize performance of the mmWave circuitry 110. As an example, elements of the mmWave circuitry 110 may have an isolation threshold of 40 decibels (dB).

The mmWave circuitry 110 includes radar circuitry 112, which may include a combination of transceiver circuitry, logic circuitry, beamforming circuitry, power management circuitry, and so on. The radar circuitry 112 may radiate and sense millimeter-waves that are within a radar frequency band using the loop antenna system 108. In some instances, the radar circuitry 112 may consist of multiple, discrete integrated circuit (IC) components, while in other instances the radar circuitry 112 may consist of a single integrated IC component such as a System-on-Chip (SoC) component. The radar circuitry 112, in combination with the loop antenna system 108, may use phase-array techniques to radiate and sense millimeter-waves using a radar frequency band ranging from 55 GHz to 65 GHz. Corresponding wavelengths of the millimeter-waves in this frequency band may range from 5.5 millimeters (mm) down to 4.6 mm, respectively.

The mmWave circuitry 110 also includes Fifth Generation New Radio (5G NR) circuitry 114 for 5G NR wireless communications. The 5G NR circuitry 114 may include another combination of transceiver circuitry, logic circuitry, beamforming circuitry, power management circuitry, and so on. In some instances, the 5G NR circuitry 114 may consist of multiple, discrete integrated circuit (IC) components, while in other instances the radar circuitry (IC) may consist of a single integrated IC component such as a System-on-Chip (SoC) component. The 5G NR circuitry 114, in combination with the loop antenna system 108, may radiate and sense millimeter-waves using a 5G NR frequency band ranging from 40 GHz to 400 GHz. Corresponding wavelengths of the millimeter-waves in this frequency band may range from 10.0 millimeters (mm) down to 1.0 mm, respectively.

The UE 102 also includes a processor 116 and a computer-readable media (CRM) 118. The processor 116 may be a single-core processor or a multiple-core processor composed of a variety of materials, such as silicon, polysilicon, high-K dielectric, copper, and so on. The CRM 118 described herein excludes propagating signals. CRM 118 may include any suitable memory or storage device such as random-access memory (RAM), static RAM (SRAM), dynamic RAM (DRAM), non-volatile RAM (NVRAM), read-only memory (ROM), or Flash memory. CRM 118 stores applications having executable code, including one or more a gesture-recognition application 120 and a 5G NR wireless communication application 122.

When executed by the processor 116, the gesture-recognition application 120 may direct the UE 102 to perform gesture recognition operations that include radiating, in a pulsing fashion, a radar field (e.g., millimeter-waves), sensing reflections from a target within the radar field, and processing the detected radar field to determine a gesture. When executed by the processor 116, the 5G NR wireless communication application 122 may direct the UE to wirelessly communicate with a base station.

As illustrated, and within the example operating environment 100, the UE 102 is radiating (e.g., pulsing using phase-array radiation) a radar field 124 within a spatial region 126 residing over the display 106 of the UE 102, sensing reflections of an object 128 (e.g., a hand in motion) within the radar field 124, and processing the detected reflections to determine a gesture. The radar field 124 may include multiples of radiated (e.g., pulsed) and detected (e.g., reflected) radar signals (e.g., multiples of the millimeter-wave 130 that are radar frequency emissions). In some instances, a recognized gesture may be a command or instruction for an operation to be performed by the UE 102, may augment an application being performed by the processor 116 of the UE 102, and so on.

Also, as illustrated, and within the example operating environment 100, the UE 102 is wirelessly communicating with a 5G NR base station 142 using a wireless communication link 134. The wireless communication link 134, in a fashion like that of the radar field 124, propagates through the spatial region 126 residing over the display 106 of the UE 102. The wireless communication link 134 includes multiples of radiated (e.g., uplink) and detected (e.g., downlink) 5G NR signals (e.g., multiples of the millimeter-wave 136 that are millimeter-wave cellular communication signals).

For improved performance of the UE 102, it is desirable for the loop antenna system 108 to radiate and sense millimeter-waves within the spatial region 126 above the display 106 of the UE 102.

Antenna System Details

Figure 2:
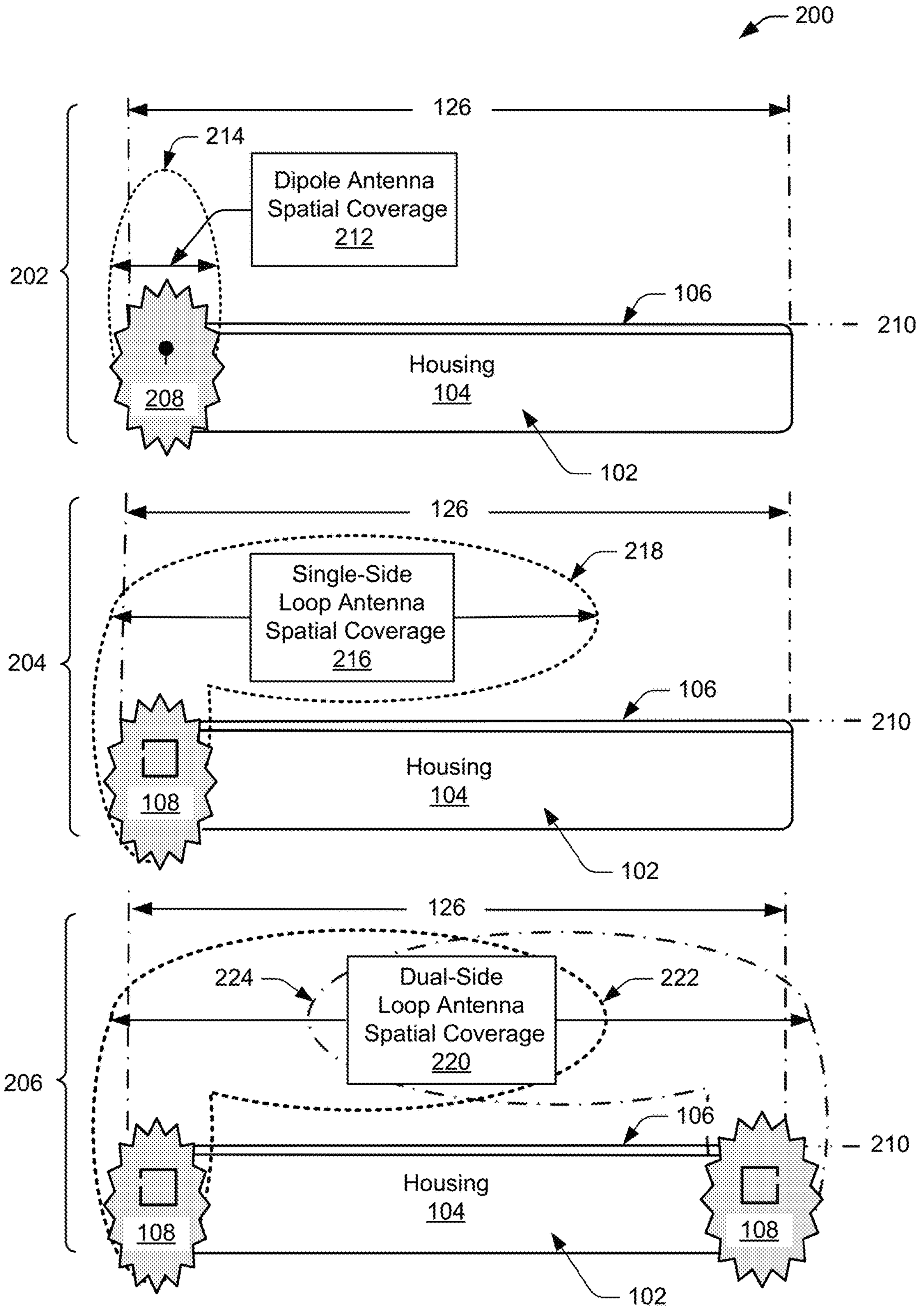
FIG. 2 illustrates an example comparison of spatial coverage of different configurations of a UE with millimeter-wave antenna systems in accordance with one or more aspects.

FIG. 2 illustrate an example comparison 200 of spatial coverage of different configurations of a UE with millimeter-wave antenna systems in accordance with one or more aspects. The configurations include a UE with a dipole antenna (e.g., configuration 202), a UE with a single-side loop antenna system (e.g., configuration 204), and a UE with a dual-side loop antenna system (e.g., configuration 206). The UE may be the UE 102 of FIG. 1, including the housing 104 and the display 106 within the housing 104.

As illustrated in FIG. 2, configuration 202 includes a dipole antenna system 208 within the housing 104. The display 106 is disposed within a display layer across a primary plane 210 defining a front surface of the UE 102 and over which the spatial region 126 resides. As illustrated, the dipole antenna system 208 provides spatial coverage (e.g., dipole antenna spatial coverage 212) for a portion of the spatial region 126. The dipole antenna spatial coverage 212 is defined, in general, by a perimeter 214 having a millimeter-wave radiation/sensitivity threshold (e.g., in decibels (dB)).

Configuration 204 includes the loop antenna system 108 of FIG. 1 within the housing 104 where the loop antenna system 108 is carried along a single side of the housing 104. In configuration 204, the loop antenna system 108 provides spatial coverage (e.g., single-side loop antenna spatial coverage 216) for portion of the spatial region 126 that is greater than the portion provided by the dipole antenna system 208. The single-side loop antenna spatial coverage 216 is defined, in general, by a perimeter 218 having a millimeter-wave radiation/sensitivity threshold (e.g., in decibels (dB)).

Configuration 206 includes multiples of (e.g., two of) the loop antenna system 108 of FIG. 1 within the housing 104, where a first loop antenna system (e.g., a first of the loop antenna system 108) is carried along a first side of the housing 104 and a second loop antenna system (e.g., a second of the loop antenna system 108) is carried along a second side of the housing 104. In configuration 206, the multiples of the loop antenna system 108 provide spatial coverage (e.g., the dual-side loop antenna spatial coverage 220) that covers the spatial region 126 in full. The dual-side loop antenna spatial coverage 220 is defined, in general, by the combination by a first perimeter 222 having a millimeter-wave radiation/sensitivity threshold (e.g., in decibels (dB)) and a second perimeter 224 having another millimeter-wave radiation/sensitivity threshold (e.g., in decibels (dB)).

Additional configurations are possible, including configurations that include three of the loop antenna system 108 carried along three sides of the housing 104, four of the loop antenna system 108 carried along four sides of the housing, and so on. Furthermore, and in some instances, variations of the loop antenna system 108 may be implemented along different sides of the housing, tuned based on local properties of the housing, and so on.

Figure 3:
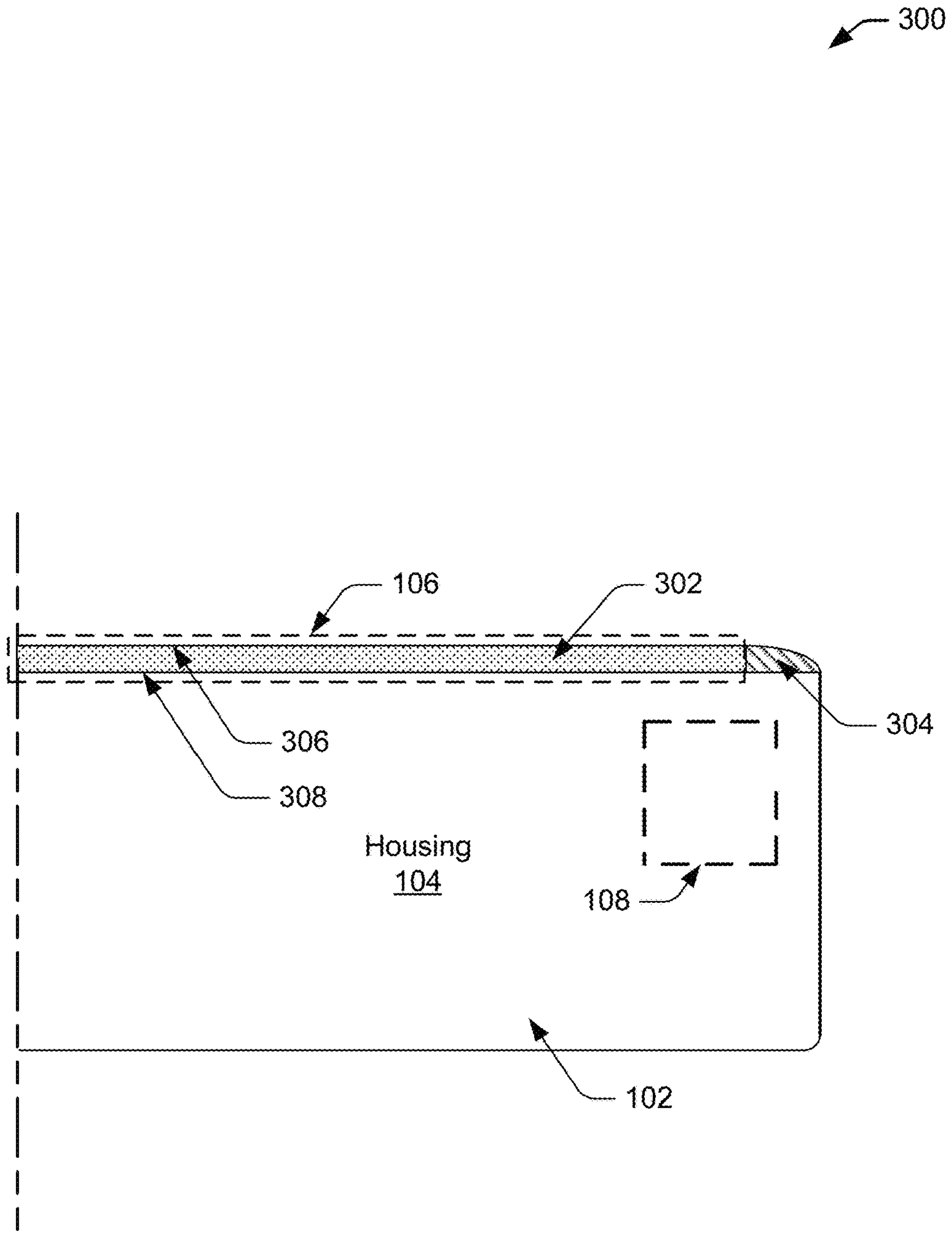
FIG. 3 illustrates details of an example loop antenna system implemented in accordance with one or more aspects.

FIG. 3 illustrates details 300 of an example loop antenna system implemented in accordance with one or more aspects. FIG. 3, in general, is a magnified view illustrating additional details of the loop antenna system 108 within the housing 104 of the UE 102.

As illustrated in FIG. 3, the display 106 may include a viewing region 302 and a non-viewing perimeter region 304. The display 106 includes an outward-facing surface 306 and an underside 308 that is opposite the outward-facing surface 306. As illustrated, the loop antenna system 108 is proximate to the underside 308 of the display 106. In some instances, a width of the non-viewing perimeter region 304 may be less than that of the loop antenna system 108. This non-viewing region 304 is shown, for illustration purposes, as larger than it may appear in practice.

Figure 4:
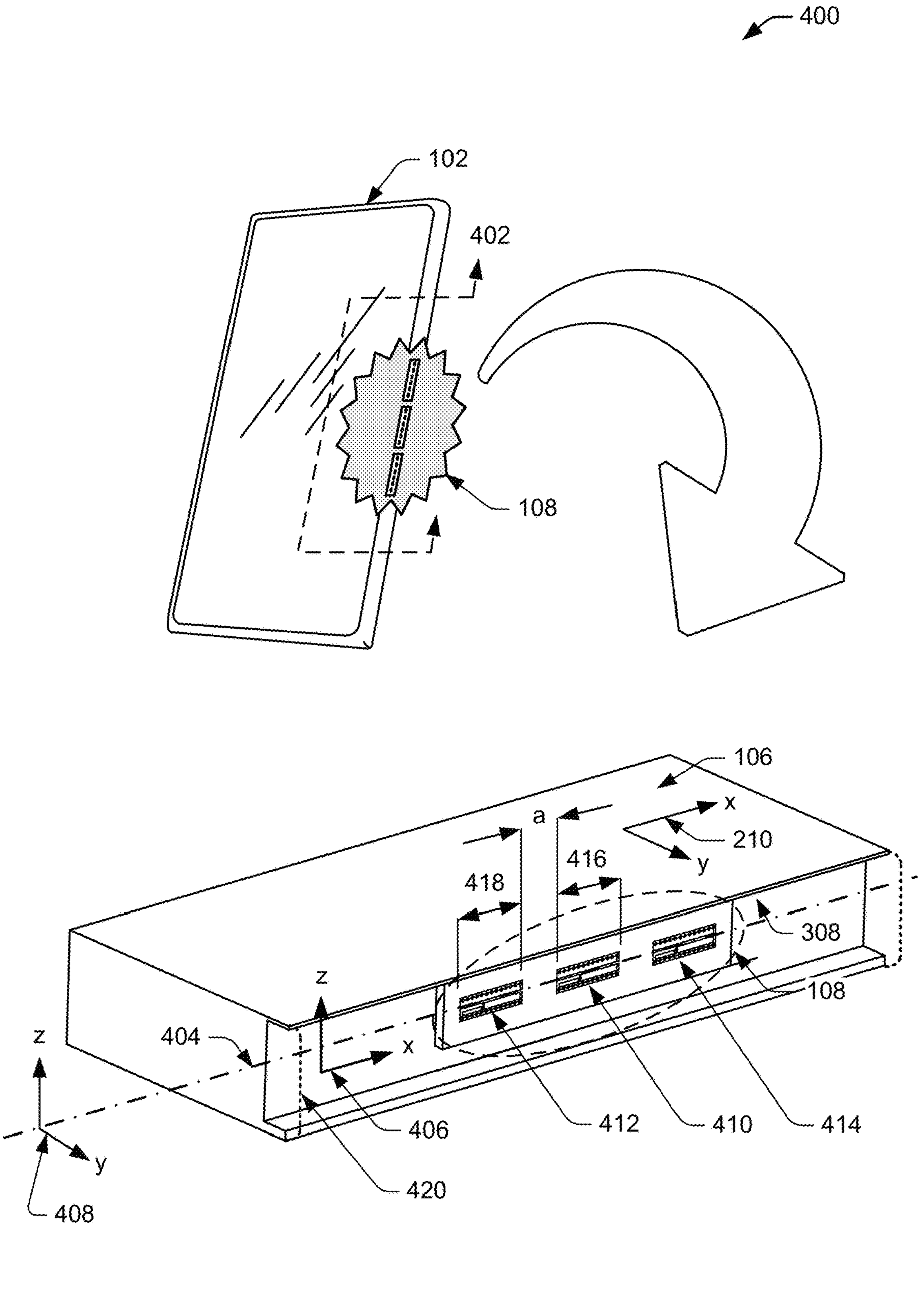
FIG. 4 illustrates other details of an example loop antenna system implemented in accordance with one or more aspects.

FIG. 4 illustrates other details 400 of an example loop antenna system implemented in accordance with one or more aspects. The loop antenna system of FIG. 4 may be the loop antenna system 108 of FIG. 1 integrated within the housing 104 of the UE 102 of FIG. 1. The bottom illustration of FIG. 4 is a magnified, section-view of the UE 102 (e.g., a section view of the region of the loop antenna system 108) and is rotated for additional clarity. The loop antenna system 108 is within the housing 104. The section-view 402 is for additional clarity.

As illustrated in FIG. 4, the display 106 is disposed within a display layer across the primary plane 210 defining the front surface of the UE 102. Also, as illustrated, the loop antenna system 108 is disposed along elongate axis 404 that is (i) proximate to the underside 308 of the display 106 and (ii) parallel to the display layer across the primary plane 210. Furthermore, the elongate axis 404 is within a secondary plane 406 (designated by the illustrated x-z axis) that is perpendicular to the primary plane 210. A location 408 of the elongate axis 404, with respect to the underside 308 of the display 106 and/or an edge of the UE 102 may vary.

The loop antenna system 108 may include one or more loop antennas. As illustrated by the example of FIG. 4, the loop antenna system 108 includes a first loop antenna 410 for radiating (e.g., transmitting) millimeter-waves and a second loop antenna 412 for sensing (e.g., receiving) millimeter-waves. Also, as illustrated, the loop antenna system 108 also includes a third loop antenna 414 which, like the second loop antenna 412, can sense (e.g., receive) millimeter waves.

The first loop antenna 410 traverses a first portion 416 of the elongate axis 404, and the second loop antenna 412 traverses a second portion 418 of the elongate axis 404. Furthermore, the first loop antenna 410 and the second loop antenna 412 may be separated by a third portion 418 of the elongate axis 404, where the third portion 418 of the elongate axis 404 has a dimension a. Depending on dimensions (length and width) of the first loop antenna 410 and the second loop antenna 412, the dimension a can range, for example, from 0.5 millimeters (mm) to 2.5 millimeters. As illustrated, the loop antenna system 108 is within the housing 104 and beneath the display 106 (e.g., FIG. 4 illustrates an edge 420 of the housing 104 for clarification purposes)

Configurations of the loop antenna system 108 can vary based on desired performance characteristics of the UE 102. As a first example, the loop antenna system 108 may include one radiating (e.g., transmitting) loop antenna and two sensing (e.g., receiving) loop antennas for a type or model of the UE 102, and may include one radiating loop antenna and one sensing loop antenna for another type or model of the UE 102. As a second example, the location 408 of the elongate axis 404 may vary based on locations of other subsystems within the UE 102, quantities or spacing of the loop antennas, or material properties of the housing 104 of the UE 102. Varying the location 408 of the elongate axis 404 may be desirable to alter spatial coverage or shield the loop antenna system 108 from other systems (e.g., sensors, circuitry) of the UE 102. As a third example, there may be multiples of the elongate axis 404, of which a first is used for one or more radiating loop antennas and of which a second is used for one or more sensing loop antennas.

Furthermore, the UE 102 may include one or more configurations of the loop antenna system 108 along multiple sides of the UE 102. As an example, the UE 102 may include a common configuration of the loop antenna system 108 along four sides of the UE 102. As another example, the UE 102 may include two different configurations of the loop antenna system 108 dedicated to two different millimeter-wave frequency bands along opposite sides of the UE 102 (e.g., a configuration of the loop antenna system 108 dedicated to a radar frequency band along one side of the UE, and another configuration of the loop antenna system 108 dedicated to a 5G NR radio frequency band along an opposite side of the UE 102).

Figure 5:
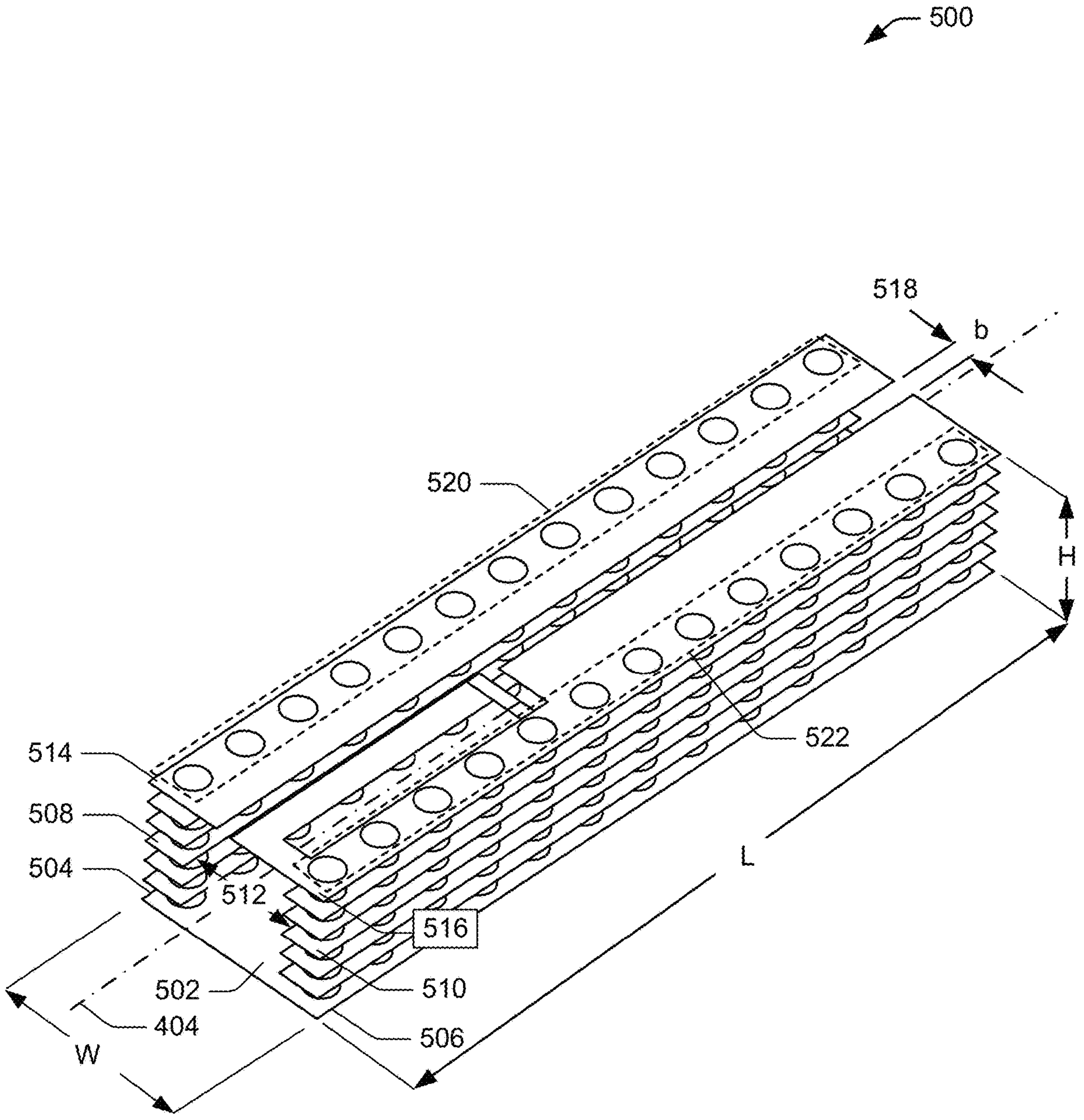
FIG. 5 illustrates details of an example loop antenna implemented in accordance with one or more aspects.

FIG. 5 illustrates details of an example multi-layer loop antenna 500 implemented in accordance with one or more aspects. The example multi-layer loop antenna 500 may be a loop antenna implemented in the loop antenna system 108 of FIG. 4. The multi-layer loop antenna 500 may be used for radiating millimeter-waves (e.g., the first loop antenna 410 of FIG. 4) or sensing millimeter-waves (e.g., the second loop antenna 412 of FIG. 4). The multi-layer loop antenna 500 is manufacturable using multi-layer fabrication techniques that are applicable to printed circuit board (PCB) manufacturing or integrated circuit (IC) manufacturing.

As example dimensions, and for PCB manufacturing fabrication techniques, a width (e.g., W) of the multi-layer loop antenna 500 may range from 0.5 millimeters (mm) to 1.5 mm A length (e.g., L) of the multi-layer loop antenna 500 may range from 2.5 mm to 5.5 mm A height (e.g., H) of the multi-layer loop antenna 500 may range from 0.3 mm to 1.5 mm. For IC manufacturing techniques, corresponding dimensions may be less in magnitude.

As illustrated in FIG. 5, the multi-layer loop antenna 500 includes multiple layers that are separated by a dielectric material. A bottom layer of the multi-layer loop antenna 500 includes a first planar electrically conductive structure 502 in a first horizontal plane. The first planar electrically conductive structure 502 has a first edge region 504 and a second edge region 506 that is opposite from the first edge region 504.

An intermediate layer of the multi-layer loop antenna 500 includes a second planar electrically conductive structure 508 and a third planar electrically conductive structure 510 that share a second horizontal plane. The second planar electrically conductive structure 508 is separated from the third planar electrically conductive structure 510 by a first gap 512 in the second horizontal plane. These planes are illustrated relative to the elongate axis 404 of FIG. 4.

A top layer of the multi-layer loop antenna 500 includes a fourth planar electrically conductive structure 514 and a fifth planar electrically conductive structure 516 that share a third horizontal plane. The fourth planar electrically conductive structure 514 is separated from the fifth planar electrically conductive structure 516 by a second gap 518 in the third horizontal plane. The second gap 518 is configured to act as a loading capacitor of the multi-layer loop antenna 500. The width of the second gap 518 may be varied to change the loading capacitance of the multi-layer loop antenna 500 and "tune" the multi-layer loop antenna 500, change a resonant frequency of the multi-layer loop antenna 500, and so on.

In some instances, the fifth planar electrically conductive structure 516 may be configured to accommodate a feed point (e.g., an electrical feed point from a transceiver of the mmWave circuitry 110). The fifth planar electrically conductive structure 516 may also, within the third horizontal plane, be configured to include a sub-loop of the multi-layer loop antenna 500.

The multi-layer loop antenna 500 includes a first set of vertical interconnect access (via) structures 520 that are perpendicular to the first horizontal plane, the second horizontal plane, and the third horizontal plane. The first set of via structures 520 electrically connect the first edge region 504 of the first planar electrically conductive structure 502 to the second planar electrically conductive structure 508 and to the fourth planar electrically conductive structure 514.

The multi-layer loop antenna 500 also includes a second set of via structures 522 that are perpendicular to the first horizontal plane, the second horizontal plane, and the third horizontal plane. The second set of via structures 522 electrically connects the second edge region 506 of the first planar electrically conductive structure 502 to the third planar electrically conductive structure 510 and to the fifth planar electrically conductive structure 516.

The multi-layer loop antenna 500 may include additional planar electrically conductive structures on additional layers. The first set of via structures 520 and the second set of via structures 522 pass through, and electrically connect, the additional planar electrically conductive structures (and planar electrically conductive structures 502, 508, 510, 514, and 516) to form a three-dimensional loop antenna that traverses a portion of the elongate axis 404 or the secondary plane 406.

The multi-layer loop antenna 500 may support different configurations of feed points for electrically connecting to the millimeter-wave circuitry (e.g., the mmWave circuitry 110). For example, another configuration may be a direct-feed configuration. A direct feed configuration may include a dedicated probe for connecting the mmWave circuitry 110 to the multi-layer loop antenna 500, as well as a ground plane that attaches directly to the multi-layer loop antenna 500. The direct-feed configuration may help isolate the multi-layer loop antenna 500 from other high-frequency circuitry of the UE 102.

In an instance of the multi-layer loop antenna 500 being manufactured using printed circuit board (PCB) fabrication techniques, different materials may be used for different features. For example, planar electrically conductive structures 502, 508, 510, 514, and 516 may use user metallization that is copper (Cu), gold (Au), or silver (Ag). A dielectric material between the planar electrically conductive structures 502, 508, 510, 514, and 516 may include a polytetrafluoroethylene (PTFE) laminate material, a low-temperature co-fired ceramic (LTCC) material, or a liquid crystal polymer (LCP) material.

In an instance of the multi-layer loop antenna 500 being manufactured using integrated circuit (IC) fabrication techniques, different materials may be used for different features.

For example, planar electrically conductive structures 502, 508, 510, 514, and 516 may use user metallization that is copper (Cu), gold (Au), or silver (Ag). A dielectric material between the planar electrically conductive structures 502, 508, 510, 514, and 516 may include a borophosphosilicate glass (BPSG).

Different levels of integration are available using the aforementioned fabrication techniques. As a first example, multiples of the multi-layer loop antenna 500 may be fabricated in a contiguous fashion as opposed to a discrete fashion (e.g., a single PCB or IC may be fabricated to include multiples of the multi-layer loop antenna 500). As a second example, and in the case of using IC fabrication techniques, the multi-layer loop antenna 500 may be included on a System-on-Chip (SoC) semiconductor die (e.g., a complementary metal-oxide semiconductor (CMOS) die) dedicated to a radar system. Such an SoC semiconductor die may include high-frequency circuitry (e.g., the radar circuitry 112, including one or more of transceiver circuitry, logic circuitry, beamforming circuitry, and power management circuitry) and multiples of the multi-layer loop antenna 500. As a third example, the multi-layer loop antenna 500, in either PCB or IC form, may be integrated as part of a multi-chip package (MCP) component.

Example Method

Figure 6:
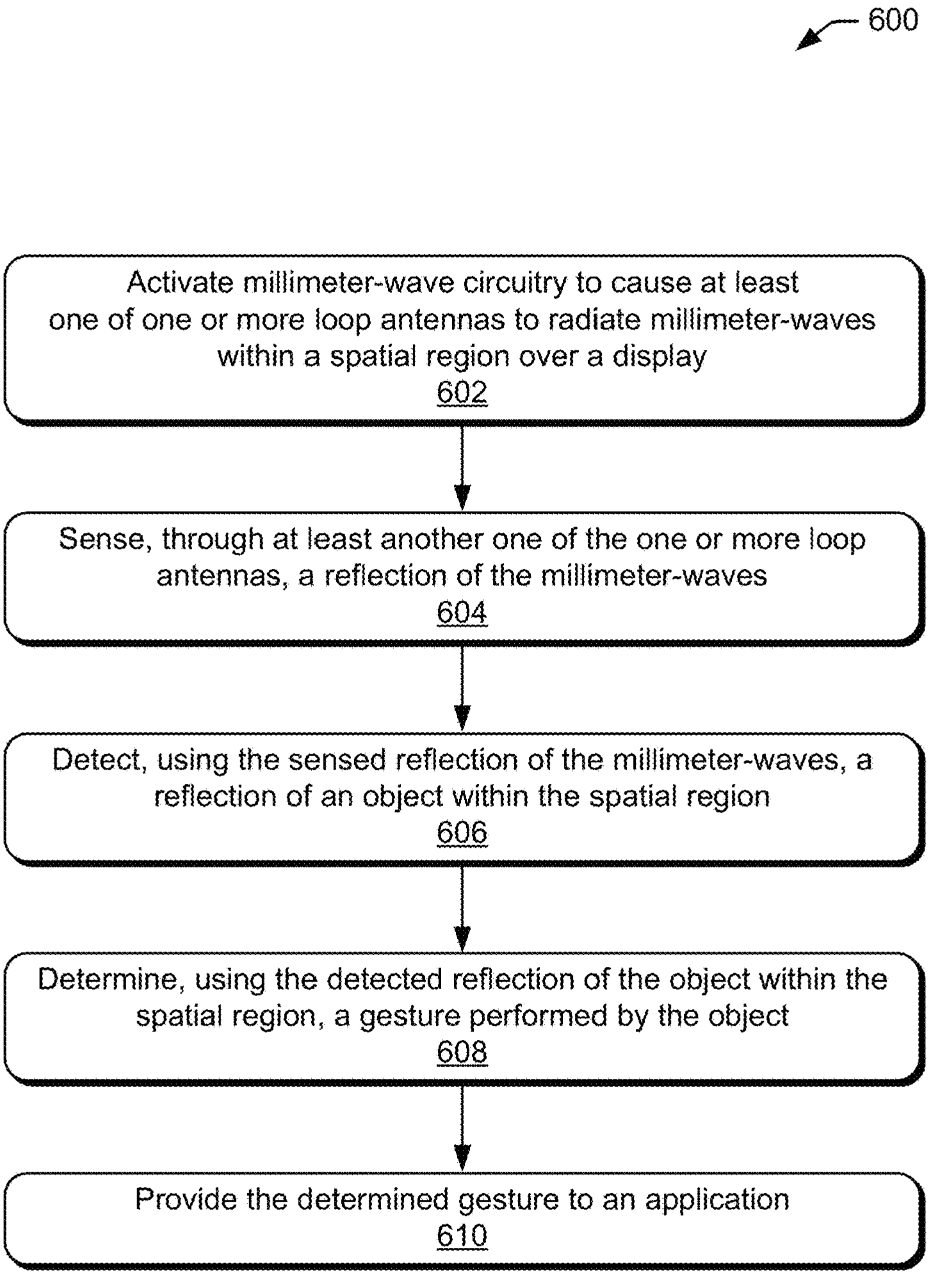
FIG. 6 illustrates an example method accordance with one or more aspects of a UE including a loop antenna system.

Example method 600 is described with reference to FIG. 6 in accordance with one or more aspects of a UE including a loop antenna system. The example method is described using operational blocks 602-610 and may be performed by the UE 102 of FIG. 1 using elements of the loop antenna system 108 using a loop antenna. In some instances, the loop antenna may be the multi-layer loop antenna 500 of FIG. 5.

Although the method 600 as described is performed by the UE 102, the operations described herein can be implemented using software, firmware, hardware (e.g., fixed logic circuitry), manual processing, or any combination thereof. Some operations of the example method may be described in the general context of executable instructions stored on computer-readable storage memory that is local and/or remote to a computer processing system, and implementations can include software applications, programs, functions, and the like. Alternatively or in addition, any of the functionality described herein can be performed, at least in part, by one or more hardware logic components, such as, and without limitation, Field-programmable Gate Arrays (FPGAs), Application-specific Integrated Circuits (ASICs), Application-specific Standard Products (ASSPs), System-on-a-chip systems (SoCs), Complex Programmable Logic Devices (CPLDs), and the like.

At operation 602, the UE 102 activates millimeter-wave circuitry (e.g., the mmWave circuitry 110) to cause at least one loop antenna to radiate millimeter-waves within a spatial region (e.g., the spatial region 126) over a display (e.g., the display 106). Activating the mmWave circuitry 110 may activate radar frequency emissions via the one or more loop antennas and activate the radar circuitry 112.

At operation 604 the UE 102 senses, through at least another one of the one or more loop antennas of the loop antenna system 108, a reflection of millimeter-waves.

At operation 606, the UE 102 detects, using the sensed reflection of the millimeter-waves, a reflection of an object (e.g., the object 128) within the spatial region 126. At operation 608, the UE 102 (e.g., the gesture-recognition application 120 executing on the processor 116) determines, using the sensed reflection of the object within the spatial region 126, a gesture performed by the object. At operation 610, the UE 102 the provides the determined gesture to an application. In some instances, the application may be executing on the UE 102, while in other instances the application may be executing remotely (e.g., as part of a cloud-computing environment).

The method 600 may, in some instances, further include activating millimeter-wave cellular communication circuitry. For example, the UE 102 may activate the 5G NR circuitry 114 and selectively emit millimeter-wave cellular communication signals via the one or more loop antennas.

Example Performance Data

Figure 7:
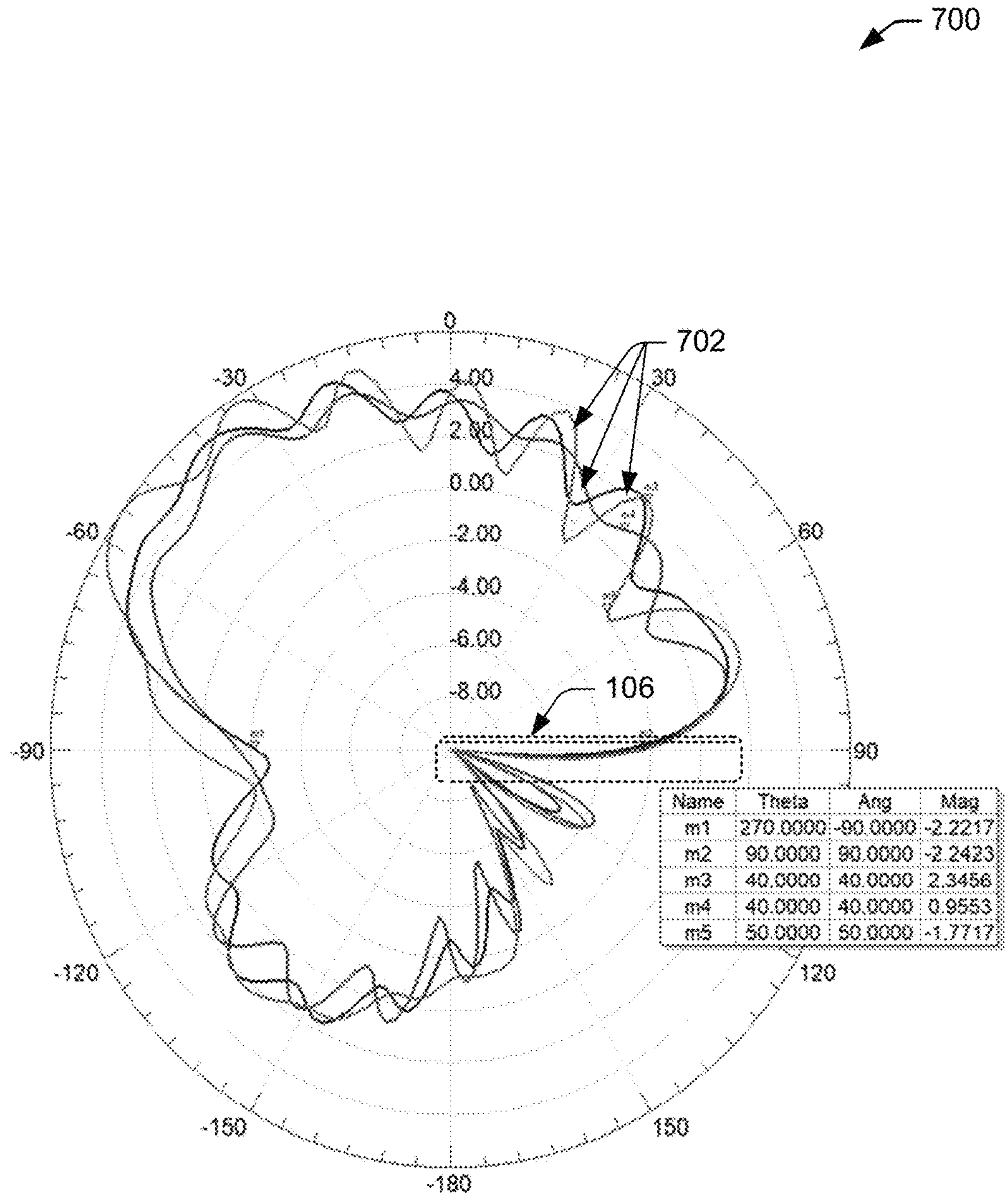
FIG. 7 illustrates example performance data of a loop antenna system in accordance with one or more aspects.

FIG. 7 illustrates example performance data 700 of a loop antenna system in accordance with one or more aspects. The loop antenna system may be similar to the loop antenna system 108 of FIGS. 1-4, using elements of FIG. 5.

As illustrated by FIG. 7, radiation patterns 702 correspond to three multi-layer loop antennas disposed along a common axis (e.g., three of the multi-layer loop antenna 500 disposed along the elongate axis 404). As illustrated, the antenna gain/loss of each of the three multi-layer loop antennas maintains a range difference of 4 decibels (dB). Furthermore, as illustrated, the radiation patterns 702 of the three-multi layer loop antenna(s) 500 extends over a spatial region above the display 106 (the display 106 of the UE 102 is illustrated for convenience).

Figure 8:
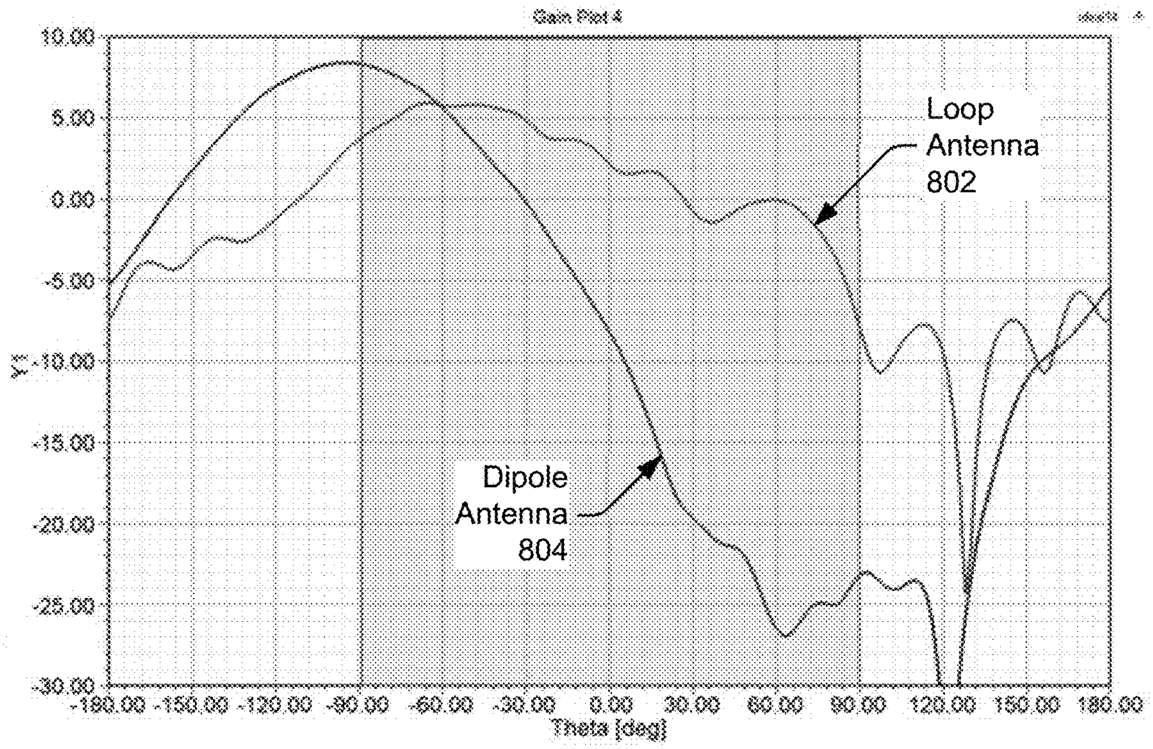
FIG. 8 illustrates an example comparison of performance data of a loop antenna system to performance data of a dipole antenna system in accordance with one or more aspects.

FIG. 8 illustrates an example comparison 800 of performance data of a loop antenna system to performance data of a dipole antenna system in accordance with one or more aspects. The loop antenna system may be similar to the loop antenna system 108 of FIGS. 1-4, using elements of FIG. 5.

As illustrated by FIG. 8, the loop antenna sensitivity-profile 802 (e.g., representing gains and losses in dB versus angular position) varies between approximately +/−5 dB through an angular position ranging from −180 degrees to +90 degrees. In contrast, the dipole antenna sensitivity-profile 804 varies from +8 db to −27 dB for the same range of angular positions.

EXAMPLES

The following paragraphs recite several examples:

Example 1: A user equipment comprising: a housing; a display within the housing, the display disposed within a display layer across a primary plane, the display layer across the primary plane defining a front surface of the UE and over which a spatial region resides; and a loop antenna system within the housing, the loop antenna system configured to sense a reflection of the millimeter-waves by an object within the spatial region, the loop antenna system having one or more loop antennas carried in the housing and disposed below the display layer across the primary plane.

Example 2: The UE as recited in example 1, wherein the loop antenna system includes multiple loop antennas.

Example 3: The UE as recited in example 1, wherein the loop antenna system includes multiple loop antennas, the multiple loop antennas oriented along an elongate axis, the elongate axis: proximate to an underside of the display, the underside of the display opposite an outward-facing surface of the display.

Example 4: The UE as recited in example 3, wherein the elongate axis is parallel to the display layer across the primary plane.

Example 5: The UE as recited in example 1, wherein a first one of the one or more loop antennas is carried on a first side of the housing.

Example 6: The UE as recited in example 5, wherein a second one of the one or more loop antennas is carried on a second side of the housing Example 7: The UE as recited in example 1, wherein a non-viewing perimeter region of the display around a viewing region of the display is smaller in width than at least one of the one or more loop antennas.

Example 8: The UE as recited in any of examples 1 to 7, wherein each of the one or more loop antennas comprises: a multi-layer loop antenna having layers separated by a dielectric material and comprising: a bottom layer including a first planar electrically-conductive structure in a first horizontal plane, the first planar electrically-conductive structure having a first edge region and a second edge region that is opposite the first edge region; an intermediate layer including second and third planar electrically-conductive structures sharing a second horizontal plane, the second and third planar electrically-conductive structures separated by a first gap in the second horizontal plane; a top layer including fourth and fifth planar electrically-conductive structures sharing a third horizontal plane, the fourth and fifth planar electrically-conductive structures separated by a second gap in the third horizontal plane, the second gap configured to act as a loading capacitor of the multi-layer loop antenna; a first set of vertical interconnect access structures that are perpendicular to the first horizontal plane, the second horizontal plane, and the third horizontal plane, the first set of vertical interconnect access structures electrically connecting the first edge region of the first planar electrically-conductive structure to the second planar electrically-conductive structure and to the fourth planar electrically-conductive structure; and a second set of vertical interconnect access structures that are perpendicular to the first horizontal plane, the second horizontal plane, and the third horizontal plane, the second set of vertical interconnect access structures electrically connecting the second edge region of the first planar electrically-conductive structure to the third planar electrically conductive structure and to the fifth planar electrically-conductive structure.

Example 9: The UE as recited in example 8, wherein the multi-layer loop antenna is formed using layers of a printed circuit board.

Example 10: The UE as recited in example 8, wherein the multi-layer loop antenna is formed using layers of an integrated circuit device.

Example 11: The UE as recited in example 10 wherein the integrated circuit device includes radar circuitry, the radar circuitry comprising one or more of: transceiver circuitry; logic circuitry; and power management circuitry.

Example 12: The UE as recited in example 8, wherein the multi-layer loop antenna is attached to a ground plane that isolates the multi-layer loop antenna from high-frequency circuitry of the UE.

Example 13: The UE as recited in example 12, wherein the multi-layer loop antenna couples to millimeter-wave circuitry of the UE using a direct-feed probe.

Example 14: The UE as recited in any of examples 8-13, wherein the first, second, third, fourth, and fifth planar electrically-conductive structures of the multi-layer loop antenna are perpendicular to the primary plane.

Example 15: The UE as recited in any of examples 1-14, further including millimeter-wave cellular communication circuitry coupled to the one or more loop antennas of the loop antenna system.

Example 16: The UE as recited in any of examples 1-15, wherein the UE is a smartphone or a smartwatch.

Example 17: A method performed by a UE, the UE including a housing, millimeter-wave circuitry, a display disposed within a display layer across a primary plane defining a front surface of the UE, and one or more loop antennas disposed behind the display layer across the primary plane, the method comprising: activating millimeter-wave circuitry to cause at least one of the one or more loop antennas to radiate millimeter-waves within a spatial region, the loop antenna system over the display; sensing, through at least one of the one or more loop antennas, a reflection of the millimeter-waves; detecting a reflection of an object within the spatial region, the detected reflection of the millimeter-waves representing a gesture performed by the object within the spatial region; determining, using the detected reflection of the millimeter-waves, the gesture performed by the object within the spatial region; and providing, to an application, the determined gesture.

Example 18: The method as recited in example 17, wherein activating the millimeter-wave circuitry of the UE activates radar frequency emissions via the one or more loop antennas.

Example 19: The method as recited in example 17, wherein activating the millimeter-wave circuitry of the UE activates millimeter-wave cellular communication circuitry and the method further comprises selectively emitting millimeter-wave cellular communication signals via the one or more loop antennas.

What is claimed is:

1. A user equipment comprising:

a housing;

a display within the housing, the display disposed within a display layer across a primary plane, the display layer across the primary plane defining a front surface of the user equipment and over which a spatial region resides; and a loop antenna system within the housing, the loop antenna system configured to sense a reflection of millimeter-waves by an object within the spatial region, the loop antenna system comprising a multi-layer loop antenna carried in the housing and disposed below the display layer across the primary plane, the multi-layer loop antenna having layers separated by a dielectric material and comprising:

a bottom layer including a first planar electrically-conductive structure in a first horizontal plane, the first planar electrically-conductive structure having a first edge region and a second edge region that is opposite the first edge region;

an intermediate layer including second and third planar electrically-conductive structures sharing a second horizontal plane, the second and third planar electrically-conductive structures separated by a first gap in the second horizontal plane; and a top layer including fourth and fifth planar electrically-conductive structures sharing a third horizontal plane, the fourth and fifth planar electrically-conductive structures separated by a second gap in the third horizontal plane, the second gap configured to act as a loading capacitor of the multi-layer loop antenna.

2. The user equipment as recited in claim 1, wherein the multi-layer loop antenna of the loop antenna system is oriented along an elongate axis of the user equipment, the elongate axis:

proximate to an underside of the display, the underside of the display opposite an outward-facing surface of the display and opposite the front surface of the user equipment.

3. The user equipment as recited in claim 2, wherein the elongate axis is parallel to the display layer across the primary plane.

4. The user equipment as recited in claim 1, wherein the multi-layer loop antenna is carried on a side of the housing.

5. The user equipment as recited in claim 4, wherein the multi-layer loop antenna comprises a first multi-layer loop antenna carried on a first side of the housing, the user equipment further comprises a second multi-layer loop antenna that is carried on a second side of the housing.

6. The user equipment as recited in claim 1, wherein a non-viewing perimeter region of the display around a viewing region of the display is smaller in width than the multi-layer loop antenna.

7. The user equipment as recited in claim 1, wherein the multi-layer loop antenna further comprises:

a first set of vertical interconnect access structures that are perpendicular to the first horizontal plane, the second horizontal plane, and the third horizontal plane, the first set of vertical interconnect access structures electrically connecting the first edge region of the first planar electrically-conductive structure to the second planar electrically-conductive structure and to the fourth planar electrically-conductive structure; and a second set of vertical interconnect access structures that are perpendicular to the first horizontal plane, the second horizontal plane, and the third horizontal plane, the second set of vertical interconnect access structures electrically connecting the second edge region of the first planar electrically-conductive structure to the third planar electrically-conductive structure and to the fifth planar electrically-conductive structure.

8. The user equipment as recited in claim 7, wherein the layers and the dielectric material of the multi-layer loop antenna comprise layers of a printed circuit board.

9. The user equipment as recited in claim 7, wherein the layers and the dielectric material of the multi-layer loop antenna comprise layers of an integrated circuit device.

10. The user equipment as recited in claim 9, wherein the integrated circuit device includes radar circuitry, the radar circuitry comprising one or more of:

transceiver circuitry;
logic circuitry; and
power management circuitry.

11. The user equipment as recited in claim 7, wherein the multi-layer loop antenna is attached to a ground plane that isolates the multi-layer loop antenna from high-frequency circuitry of the user equipment.

12. The user equipment as recited in claim 11, wherein the multi-layer loop antenna couples to millimeter-wave circuitry of the user equipment using a direct-feed probe.

13. The user equipment as recited in claim 7, wherein the first, second, third, fourth, and fifth planar electrically-conductive structures of the multi-layer loop antenna are perpendicular to the primary plane.

14. The user equipment as recited in claim 1, further including millimeter-wave cellular communication circuitry coupled to the multi-layer loop antenna of the loop antenna system.

15. The user equipment as recited in claim 1, wherein the user equipment is a smartphone or a smartwatch.

16. A method performed by a user equipment, the user equipment including a housing, millimeter-wave circuitry, a display disposed within a display layer across a primary plane defining a front surface of the user equipment, and one or more multi-layer loop antennas disposed behind the display layer across the primary plane, at least one of the multi-layer loop antennas having layers separated by a dielectric material and comprising a bottom layer including a first planar electrically-conductive structure in a first horizontal plane, the first planar electrically-conductive structure having a first edge region and a second edge region that is opposite the first edge region, an intermediate layer including second and third planar electrically-conductive structures sharing a second horizontal plane, the second and third planar electrically-conductive structures separated by a first gap in the second horizontal plane, and a top layer including fourth and fifth planar electrically-conductive structures sharing a third horizontal plane, the fourth and fifth planar electrically-conductive structures separated by a second gap in the third horizontal plane, the second gap configured to act as a loading capacitor of the multi-layer loop antenna, the method comprising:

activating millimeter-wave circuitry to cause one of the one or more multi-layer loop antennas to radiate millimeter-waves within a spatial region over the display;

sensing, through another one of the one or more multi-layer loop antennas, a reflection of the millimeter-waves;

detecting, using the sensed reflection of the millimeter-waves, a reflection of an object within the spatial region, the detected reflection of the object representing a gesture performed by the object within the spatial region;

determining, using the detected reflection of the object within the spatial region, the gesture performed by the object within the spatial region; and providing, to an application, the determined gesture.

17. The method as recited in claim 16, wherein activating the millimeter-wave circuitry of the user equipment activates radar frequency emissions via the one or more multi-layer loop antennas.

18. The method as recited in claim 16, wherein activating the millimeter-wave circuitry of the user equipment activates millimeter-wave cellular communication circuitry and the method further comprises selectively emitting millimeter-wave cellular communication signals via the one or more multi-layer loop antennas.

* * * * *